United States Patent [19]

VanWeelden et al.

[11] Patent Number: 5,069,315
[45] Date of Patent: Dec. 3, 1991

[54] PROTECTION DEVICE FOR A MANUAL SLACK ADJUSTER

[76] Inventors: Marvin H. VanWeelden; Susan V. VanWeelden, both of 1153 Florimond Dr., Elgin, Ill. 60123

[21] Appl. No.: 545,552

[22] Filed: Jun. 29, 1990

[51] Int. Cl.⁵ .............................................. F16D 65/40
[52] U.S. Cl. ................... 188/79.55; 188/382; 411/377; 411/431; 411/910
[58] Field of Search ............... 188/79.55, 79.51, 79.57, 188/382; 411/373, 377, 431, 910

[56] References Cited

U.S. PATENT DOCUMENTS

| | | |
|---|---|---|
| 2,140,239 | 12/1938 | Lewis . |
| 2,822,848 | 2/1958 | Thomas . |
| 3,261,433 | 7/1966 | Page ........................ 188/79.55 X |
| 3,339,608 | 9/1967 | Brenner . |
| 4,442,923 | 4/1984 | Wakasuki et al. ................ 188/79.55 |
| 4,499,978 | 2/1985 | Norcross .......................... 188/79.55 |
| 4,660,610 | 4/1987 | McIntire . |
| 4,809,820 | 3/1989 | Smith .............................. 188/79.55 |

Primary Examiner—George E. A. Halvosa
Attorney, Agent, or Firm—Mathew R. P. Perrone, Jr.

[57] ABSTRACT

A protection device for the adjusting nut, which adjusts brake slack adjuster of a heavy duty truck is an adjusting nut cover of a generally arcuate shape having a gripping member at one end thereof to hold the cover in position over the adjusting nut, and a removal member at the other end thereof to provide for removing the adjusting nut cover or making the adjusting nut accessible.

19 Claims, 2 Drawing Sheets

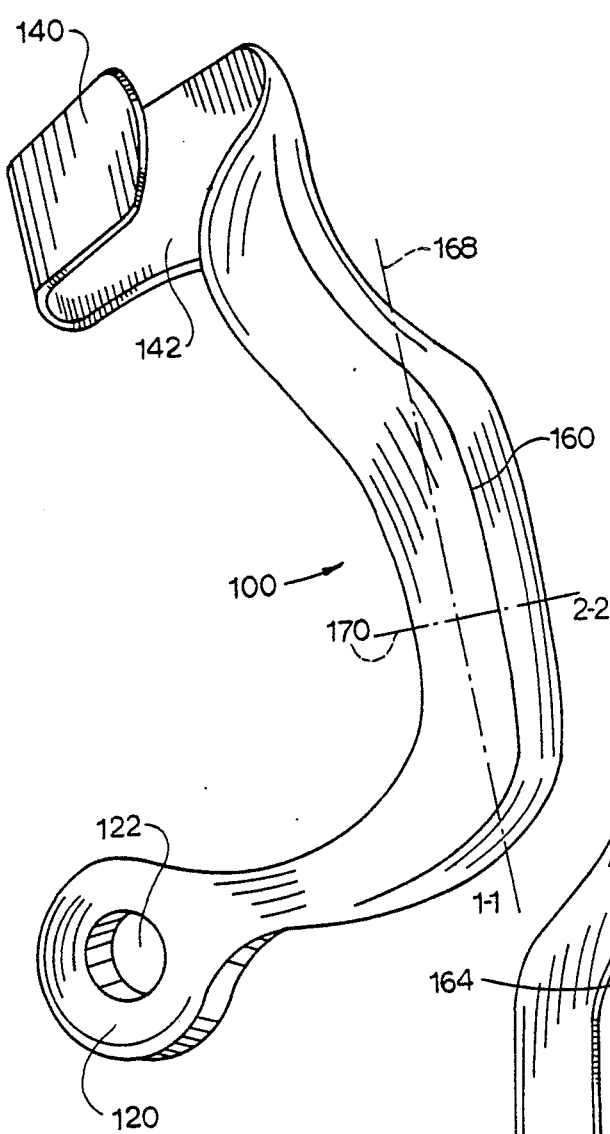
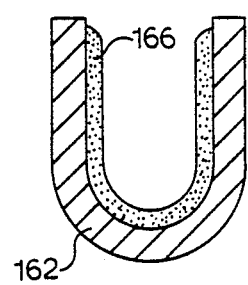
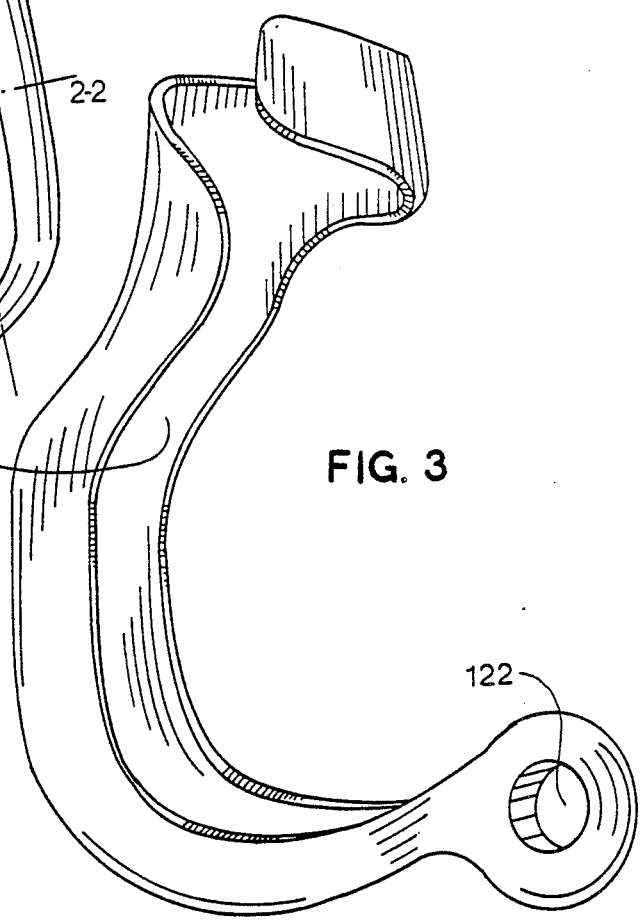

PROTECTION DEVICE FOR A MANUAL SLACK ADJUSTER

This invention relates to protection device for heavy duty truck and more particularly to a protection device for the adjusting nut for brake slack adjuster of a heavy duty truck.

BACKGROUND OF THE INVENTION

Heavy duty trucks—especially those trucks weighing more than 3.6 metric tons (8,000 pounds), generally have air brakes. Air brakes, as do all brakes, need adjustments. In order to accomplish this adjustment, an adjusting nut has been placed on a slack adjuster in a common fashion for adjusting air-brakes. Unfortunately this adjusting nut is exposed to the elements and heavy duty wear that a truck of this type normally endures. With the exposure to the elements, the slack adjusting nut becomes corroded and difficult to operate. With such corrosion, the adjusting of the slack on the air-brakes becomes difficult if not impossible.

Slack adjusters are found on all air-brake trucks. This includes trucks weighing more than four tons; such as tractor trailers. It is highly desirable to protect the adjusting nut from the elements. Yet there is no current device capable of providing reliable protection for the adjusting nut.

A truck driver is known to use rags or other implements to protect the adjusting nut from the elements. The rags do not absorb the pounding and exposure to the elements common to such heavy duty trucks. The countervailing factor coming with the protection of the adjusting nut is that accessibility to the adjusting must also be maintained. Such protection is of little value if accessibility is not maintained.

A truck driver has a tendency, especially in inclement weather, to postpone slack adjustments to brakes. The adjustments are difficult and irritating due to dirt, moisture, and grime which clog the adjusting nut on the slack adjuster.

The corrosion can lead to the breaking of the adjusting nut on the slack adjuster, when an attempt to move the nut is attempted. If the adjusting nut breaks, the entire slack adjuster must be replaced. Since there are about eight slack adjusters on each vehicle, replacement of these parts on a truck can be expensive. It is desirable to find a method and device of protecting the adjusting nut so that the slack adjusters can last, and not have the adjusting nut break or fail to act, when an adjustment is required.

In an attempt to overcome the problem with the manual slack adjusters, automatic slack adjusters are known. However, these adjusters are not sufficient and not durable. In fact, the automatic slack adjusters are not usually left on the vehicle by most drivers, because they do not work well enough to please the driver. Additionally, a truck driver feels more comfortable with a personally adjusted adjusting nut.

SUMMARY OF THE INVENTION

Accordingly, among the many objectives of this invention, is to provide a removable cover for the adjusting nut on a slack adjuster of a heavy duty truck.

A further objective of this invention is to provide a removable cover for an adjusting nut to minimize corrosion.

A still further objective of this invention is to provide a removable cover for an adjusting nut to protect the adjusting nut from the elements.

Yet a further objective of this invention is to provide a removable cover for an adjusting nut to keep the adjusting nut easy to operate.

Also an objective of this invention is to provide a removable cover for an adjusting nut so that the driver is willing to make the adjustments.

Another objective of this invention is to provide a removable cover for an adjusting nut to avoid breaking the nut.

Still another objective of this invention is to provide a removable cover for an adjusting nut to avoid replacement of the slack adjuster.

Yet another objective of this invention is to provide a removable cover for an adjusting nut to avoid use of rags to protect the adjusting nut from the elements.

A further objective of this invention is to provide a removable cover for, which maintains accessibility while providing protection.

These and other objectives of this invention (which other objectives become clear by considering the specification, claims and drawings as a whole) are met by providing an adjusting nut cover of a generally arcuate shape having a clipping member at one end thereof to hold the cover in position over the adjusting nut, and a gripping member at the other end thereof to provide for removing the adjusting nut cover or making the adjusting nut accessible. The central portion of the adjusting nut cover includes a preferably padded, arcuate U-shaped member between the clipping member and the gripping member, to protect the adjusting nut of slack adjuster for an air brake.

BRIEF DESCRIPTION OF DRAWINGS

FIG. 2 depicts a top perspective view of adjusting nut cover 100 of this invention.

FIG. 3 depicts a bottom perspective view of adjusting nut cover 100 of this invention as a reverse view of FIG. 2.

FIG. 4 depicts a cross-section view of adjusting nut cover 100 of this invention along Line 2—2 in FIG. 2.

Throughout the figures of the drawing where the same part appears in more than one figure of the drawing, the same number is applied thereto.

DESCRIPTION OF THE PREFERRED EMBODIMENTS

Figure 1:
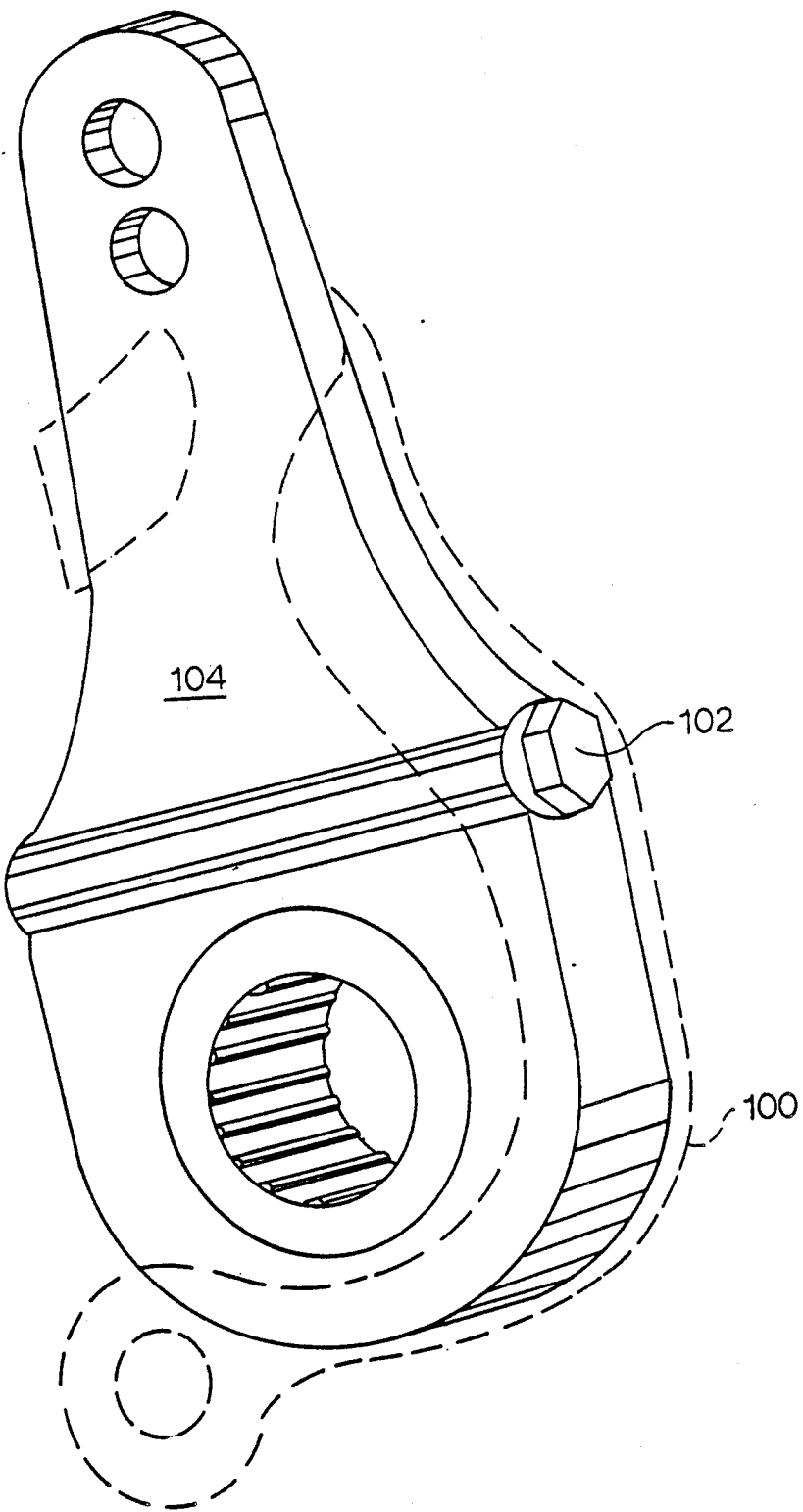
FIG. 1 depicts a top perspective view of adjusting nut cover 100 of this invention shown in dotted lines over adjusting nut 102.

Accordingly, the adjusting nut cover of this invention protects slack adjusting nut on an air brake for a heavy duty truck. The adjusting nut cover is a flexible moldable plastic element having sufficient rigidity to protect the adjusting nut. At one end thereof is a ring or other gripping device for use in applying or removing the adjusting nut cover. The ring extends out into a hollow grooved arm capable of surrounding the adjusting nut. The groove terminates in flattened, spring-like, circular piece which serves as a clipping member to hold the adjusting nut cover over the adjusting nut and protect the same from the elements.

This device provides a covering or jacket for a slack adjuster on a heavy duty truck. The adjusting nut cover cap device is manufactured from a flexible plastic, metallic, other suitable material or mixtures thereof. The adjusting nut cover is a covering that keeps dirt, moisture, grime, and other undesirable material from the adjusting nut and collar on a slack adjuster.

Referring now to FIG. 1 and FIG. 2, an adjusting nut cover 100 as a protection device for the adjusting mechanism such as adjusting nut 102 used with the slack adjuster 104 of an air brake (not shown) is made up of flexible material. At one end of the adjusting nut cover 100 is a finger gripping mechanism 120. Oppositely disposed from the finger gripping mechanism 120 is a clipping mechanism 140. Between the finger gripping mechanism 120 the clipping mechanism 140 is central portion 160.

The adjusting nut cover 100 has the central portion 160 both arcuate and U-shaped to surround and protect the adjusting nut 102. The arcuate and U-shaped central portion 160 terminates at one end thereof at the finger gripping mechanism 120 and at the other end thereof in clipping mechanism 140. The clipping mechanism 140 may or may not be spring loaded. The spring may be molded into clipping mechanism 140. The plastic itself may achieve the gripping. A spring may assist therewith.

The finger gripping mechanism 120 serves to remove adjusting nut cover 100 or expose adjusting nut 102 for use. The spring loaded clipping mechanism 140 holds adjusting nut cover 100 in place. Central portion 160 serves to jacket or protect the adjusting nut 102.

As can be seen, the arcuate central portion 160 is longitudinally arcuate along longer axis 168 (also called Line 1—1), and horizontally U-shaped along shorter axis 170 (also called Line 2—2). Longer axis 168 (also called Line 1—1) is substantially perpendicular to shorter axis 170 (also called Line 2—2). This combination provides a pocket within central portion 160 to receive and protect the adjusting nut 102.

The finger gripping mechanism 120 (or ring) serves to remove adjusting nut cover 100 or expose adjusting nut 102 for use. In the preferred form as shown, finger gripping mechanism 120 includes an aperture 122 substantially perpendicular to shorter axis 170 (also called Line 2—2).

The spring loaded clipping mechanism 140 holds adjusting nut cover 100 in place over adjusting nut 102 and on slack adjuster 104. Clipping mechanism 140 is generally flattened member 142, and circular U-shaped, or arcuate. Flattened member 142 may or may not be foamed on the interior thereof. A U-shaped flattened member 142 is reversed relative to shorter axis 170 (also called Line 2—2). Clipping mechanism 140 is preferred to have an axis of symmtery substantially parallel to shorter axis 170 (also called Line 2—2).

The flexibility of clipping mechanism 140 permits removable application of adjusting nut cover 100 to protect or provide acess to adjusting nut 102. Clipping mechanism 140 also strongly positions central portion 160 on slack adjuster 104 and over adjusting nut 102.

Because this material of adjusting nut cover 100 is flexible, and easily removed or applied, the flexibility provides for the adjusting nut cover 100 to stay in place and protect the adjusting nut 102 while at the same time providing for easy removal of the adjusting nut cover 100 when it is desirable to achieve access to the adjusting nut 102. The flexibility and durability of the synthetic resin or plastic material provides for this durability and achieves substantially improved results.

Referring now to FIG. 3 and FIG. 4, the exterior 162 of the central portion 160 is plastic or other suitable material. The interior 164 is plastic and preferably includes foam 166. In other words, interior 164 provides for protection of adjusting nut 102 due to the foam nature. Of course, other suitable, flexible material may also be used for adjusting nut cover 100. Central portion 160 is arcuate at its longer axis 168 (also called Line 1—1) and U-shaped on its shorter axis 170 (also called Line 2—2).

Foam 166, as shown in FIG. 4, is preferred in central portion 160. Foam 166 may also extend to clipping mechanism 140 if desired. The foam 166, as shown in FIG. 4, may extend throughout the interior 164 of adjusting nut cover 100. However, foam 166 provides a substantial amount of additional protection. The interior 164 of central portion 160 is preferred to include foam 166. Foam 166 may be formed in place by a blowing agent, laminated to adjusting nut cover 100 or provided in any other suitable fashion.

The adjusting nut cover 100 is extremely useful for trucks with slack adjusters. All drivers of heavy duty trucks are potential customers. This device offers convenience and can result in safer trucks due especially to simplification of brake adjustments. Truck drivers are greatly annoyed by slack adjusters that do not stay adjusted. Adjustments need to be made by hand on each slack adjuster The visual and hands-on adjustment of each slack adjuster is important in the safety of the air-brakes on large trucks. No substitute for individual adjustment is probable.

The adjusting nut cover 100 keeps the collar of the slack adjuster 104 clean and accessible. When the adjusting nut cover 100 is removed, the adjustments to the slack adjuster 104 on the brakes are made more easily. The adjusting nut cover 100 jackets also prolongs the life of each slack adjuster. Each air-brake truck has from six to ten slack adjusters. Lack of proper adjustment (to slack adjusters on air-brake trucks) affects the ability to brake or stop a truck. Thus safety is an important factor in the adjusting nut cover 100 of this invention.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are closely covered by this disclosure.

What is claimed and sought to be protected by Letters Patent of the United States is:

1. A protection device for an adjusting means, said adjusting means being used for a brake slack adjuster on an air brake system of a heavy duty truck, wherein:
 a. said protection device has a generally elongated, arcuate, central portion;
 b. said central portion has a first end and a second end oppositely disposed from said first end to complete said protection device;
 c. said protection device has a clipping mechanism at said first end thereof and a gripping member at said second end thereof, with said central portion therebetween;

d. said protection device is sufficiently rigid to protect said adjusting means;
e. said gripping member is adapted to apply or remove said protection device;
f. said clipping mechanism is adapted to grip said brake slack adjuster to thereby hold said protection device over said adjusting means and minimize wear of said adjusting means;
g. said central portion is adapted to be received over a nut of said slack adjuster;
h. said central portion is adapted to cover and protect said adjusting means by receiving said slack adjuster within said central portion; and
i. said protection device is flexible.

2. The protection device of claim 1, wherein:
a. said gripping member includes a finger gripping mechanism;
b. said central portion is arcuate on a long axis of symmetry and U-shaped on a shorter axis of symmetry;
c. said clipping mechanism is substantially U-shaped; and
d. an axis of symmetry for said clipping mechanism is substantially parallel to said shorter axis.

3. The protection device of claim 2, wherein:
a. said central portion is both arcuate and U-shaped to surround and protect said adjusting means; and
b. said clipping mechanism grips said slack adjuster and holds said central portion over said adjusting means.

4. The protection device of claim 2, wherein:
a. said central portion is longitudinally arcuate along said long axis;
b. said central portion is horizontally U-shaped along said shorter axis; and
c. said arcuate central portion includes a pocket to surround said slack adjuster, and to receive and protect said adjusting means.

5. The protection device of claim 4, wherein:
a. said finger gripping mechanism includes a gripping ring; and
b. said gripping ring combines with the flexibility of said protection device to provide for removal of said protection means or for exposure of said adjusting means.

6. The protection device of claim 5, wherein said clipping mechanism is a generally flattened end of said protecting device adapted to receive said slack adjuster and hold said central portion over said adjusting means.

7. The protection device of claim 6, wherein said clipping mechanism is arcuate in shape.

8. The protection device of claim 6, wherein said clipping mechanism is circular in shape.

9. The protection device of claim 6, wherein said clipping mechanism is U-shaped and reversed relative to said U-shaped central portion.

10. The protection device of claim 9, wherein:
a. said clipping mechanism has flexibility;
b. said flexibility provides for said adjusting means cover to stay in place and protect said adjusting means, and exposure of said adjusting means without removal of said protection device.

11. The protection device of claim 10, wherein:
a. an exterior of said central portion is made of a flexible plastic material; and
b. an interior of said central portion includes foam to surround and removably protect said adjusting means.

12. A protection device for an adjusting nut, said adjusting nut being used for a brake slack adjuster of a heavy duty truck, said protection device having a generally arcuate shape with a gripping member, a clipping mechanism and a central portion, wherein:
a. said central portion is generally elongated and arcuate;
b. said protection device has said clipping mechanism at a first end thereof and said gripping member at second end thereof, with said central portion therebetween;
c. said protection device is sufficiently rigid to protect said adjusting nut;
d. said gripping member is adapted to apply or remove said protection device;
e. said clipping mechanism is adapted to grip said brake slack adjuster to thereby hold said protection device;
f. said central portion is adapted to cover and protect said adjusting nut by receiving said slack adjuster within said central portion to thereby minimize wear of said adjusting nut;
g. said protection device is flexible;
h. said central portion is arcuate on a long axis of symmetry and U-shaped on a shorter axis of symmetry;
i. an axis of symmetry for said clipping mechanism is substantially parallel to said shorter axis;
j. said central portion surrounds and protects said adjusting nut;
k. said clipping mechanism grips said slack adjuster and holds said central portion over said adjusting nut; and
l. said arcuate central portion includes a pocket to receive and to protect said adjusting nut.

13. The protection device of claim 12, wherein:
a. said gripping member includes a finger gripping mechanism;
b. said clipping mechanism is substantially U-shaped;
c. said central portion includes said long axis and is longitudinally arcuate;
d. said central portion includes said shorter axis and is horizontally U-shaped; and
e. said gripping member combines with the flexibility of said protection device to provide for removal of said protection device from said adjusting means, or for exposure to said adjusting nut.

14. The protection device of claim 13, wherein:
a. said finger gripping mechanism includes a gripping ring; and
b. said clipping mechanism is a generally flattened end of said protection device adapted to receive said slack adjuster and hold said central portion over said adjusting nut.

15. The protection device of claim 14, wherein:
a. an exterior of said central portion is made of a flexible plastic material; and
b. an interior of said central portion includes foam to surround and removably protect said adjusting nut.

16. The protection device of claim 15, wherein said clipping mechanism is arcuate in shape.

17. The protection device of claim 15, wherein said clipping mechanism is circular in shape.

18. The protection device of claim 15, wherein said U-shape of said clipping mechanism is reversed relative to said U-shaped central portion.

19. In a heavy duty truck having an air brake system as a stopping mechanism, said air brake system including a slack adjusting means for adjusting slack in said air brake system, an adjusting means nut for said slack adjusting means, and a protection device for said adjusting means nut, said adjusting means nut being used for said slack adjusting means of a heavy duty truck, the improvement wherein said protection device has a generally arcuate shape with a gripping member, a clipping mechanism and a central portion, and further wherein:

a. said central portion is generally elongated and arcuate;
b. said central portion has a first end and a second end oppositely disposed from said first end;
c. said protection device has said clipping mechanism at said first end thereof and said gripping member at said second end thereof, with said central portion therebetween;
d. said protection device is sufficiently rigid to protect said adjusting nut;
e. said gripping member is adapted to apply or remove said protection device;
f. said clipping mechanism is adapted to grip said brake slack adjuster to thereby hold said protection device over said adjusting nut;
g. said central portion is adapted to cover and protect said adjusting means by receiving said slack adjuster within said central portion to thereby minimize wear of said adjusting nut;
h. said protection device is flexible;
i. said central portion is arcuate on a long axis of symmetry and U-shaped on a shorter axis of symmetry;
j. an axis of symmetry for said clipping member is substantially parallel to said shorter axis;
k. said central portion is both arcuate and U-shaped to surround and protect said adjusting nut;
l. said clipping mechanism grips said slack adjuster and holds said central portion over said adjusting nut; and
m. said arcuate central portion includes a pocket to receive and to protect said adjusting nut.

* * * * *